UNITED STATES PATENT OFFICE.

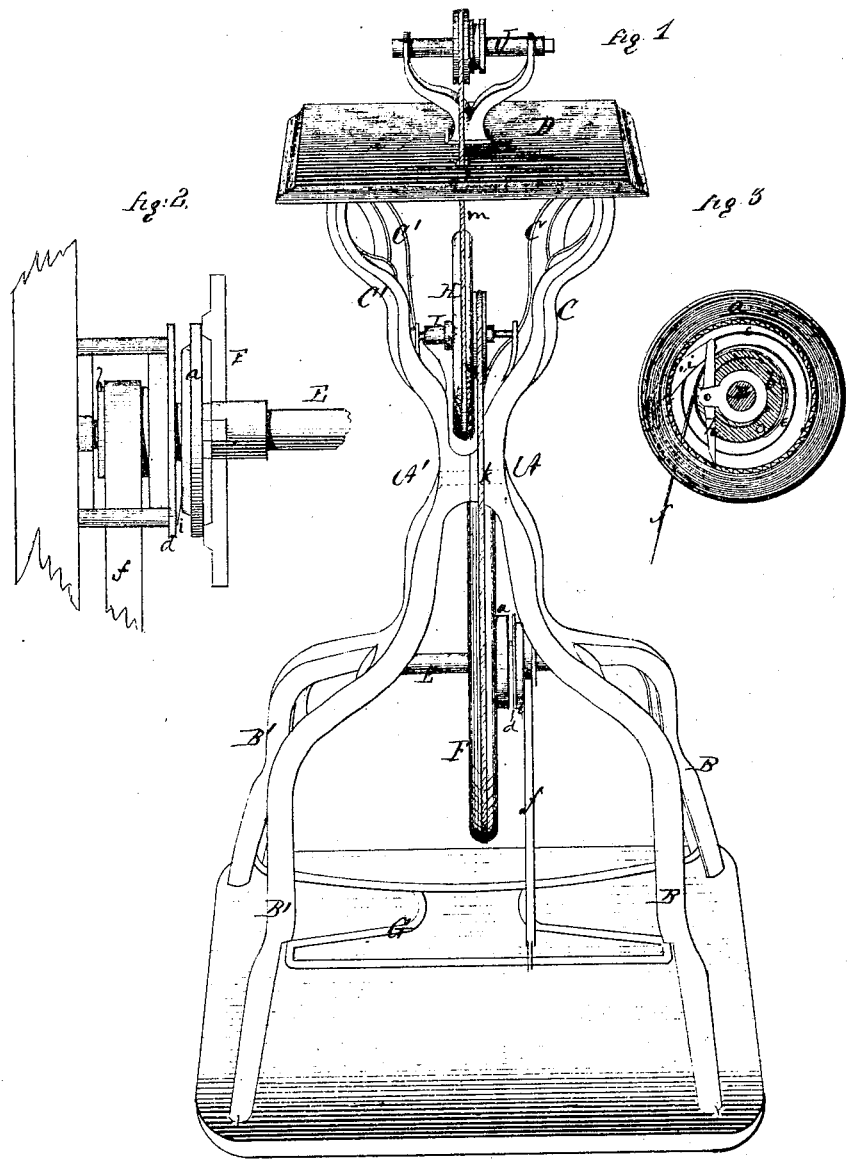

JAMES F. STEWART, FREDRICH KLINKERMAN, AND JAMES LAMB, OF AURORA, IND., ASSIGNORS TO JAMES LAMB AND JAMES F. STEWART.

IMPROVED MECHANISM FOR TRANSMITTING POWER TO LATHES AND OTHER MACHINERY.

Specification forming part of Letters Patent No. 102,445, dated April 26, 1870.

*To all whom it may concern:*

Be it known that we, JAMES LAMB, JAS. F. STEWART, and FRED. KLINKERMAN, of Aurora, in the county of Dearborn, and in the State of Indiana, have invented certain new and useful Improvements in Lathes; and we do hereby declare that the following is a full, clear, and exact description thereof, reference being had to the accompanying drawings, and to the letters of reference marked thereon, making a part of this specification.

The nature of this invention consists in the ratchet movement or power, as hereinafter described, for the operation of a lathe or other machine, whereby the usual crank is dispensed with, thus avoiding the necessity of pausing or resting on centers.

In order to enable others skilled in the art to which our invention appertains to make and use the same, we will now proceed to describe its construction and operation, referring to the annexed drawings, in which—

Figure 1 is a perspective view of the entire lathe. Fig. 2 is an enlarged front view of the ratchet movement, and Fig. 3 is an enlarged side view of the same.

A A′ represent the two halves of the frame or stand of our machine, each of which is so curved or bent as to form two legs or supports, B B and B′ B′, at its lower extremity, and above the point where the two halves are connected they form each two arms, C C and C′ C′, to support the machine-table D.

In suitable bearings under the connecting-point of the two halves A A′ of the stand is placed a shaft, E, on which is mounted the driving-wheel F.

Around the hub of the driving-wheel F is placed a circular flange, $a$, which is provided with teeth on its inner circumference; and close to the said circular flange, around the shaft E, is a loose collar, $b$, connected by a spring, $e$, to a stationary collar or flange, $d$, through which the shaft passes. Around the loose collar $b$ is also wound a belt, $f$, which is connected with the treadle G, the said belt $f$ and spring $e$ being arranged in such a manner that when the treadle G is pressed downward the belt will operate to turn the collar so as to wind up the spring, and as soon as the force is removed from the treadle the spring will unwind, turning the collar in the opposite direction, and wind up the belt, raising the treadle again.

The treadle G is pivoted to the rear feet of the stand, and the front feet are cut out or provided with shoulders, so that the treadle cannot be raised up more than a certain distance.

To an ear on the inner side of the loose collar $b$ is pivoted a dog, $h$, which is provided with a spring, $i$, that bears against the stationary flange $d$. This dog is so arranged that when the treadle G is turned downward the spring $i$ will throw the dog down so as to catch in the teeth of the flange $a$, and consequently turn the driving-wheel F and shaft E; but as soon as the force is removed from the treadle and the loose collar $b$ commences to turn backward the spring $i$ will throw the dog out of gear with the teeth in the flange $a$, and thus allow the driving wheel and shaft to continue revolving from the momentum already obtained until the next downward stroke of the treadle.

The driving-wheel F is, by a belt, $k$, connected with a grooved circular flange on the side of a smaller wheel, H, which is mounted upon a shaft, I, having suitable bearings above the connecting-point of the two halves of the stand or frame for the machine.

The wheel H is, by means of a belt, $m$, connected with and imparts motion to the lathe J, the said belt passing through holes in the table D.

It will readily be seen that by the addition or interposition of the wheel H between the driving-wheel F and the head or lathe J, in the manner above described, a much more rapid rotary motion is imparted to the head.

By increasing the size of the collar or pulley $b$ the leverage and power is of course correspondingly increased, and by this means we are enabled to obtain as many revolutions as desired from one stroke of the treadle.

Having thus fully described our invention, what we claim as new, and desire to secure by Letters Patent, is—

The combination and arrangement of the driving-wheel F with its toothed flange $a$, loose collar $b$, spring $e$, belt $f$, dog $h$, and spring $i$, all constructed and operating substantially in the manner and for the purposes herein set forth.

In testimony that we claim the foregoing we have hereunto set our hands this 23d day of August, 1869.

JAS. F. STEWART.
FREDRICH KLINKERMAN.
JAMES LAMB.

Witnesses:
LOUIS M. FOULK,
PETER W. WILLIAMS.